United States Patent Office 3,309,433
Patented Mar. 14, 1967

3,309,433
METHOD OF MAKING GRAPHITE ARTICLES
Fred Roberts, Newbury, England, assignor to United Kingdom Atomic Energy Authority, London, England
No Drawing. Filed July 10, 1964, Ser. No. 381,891
Claims priority, application Great Britain, July 17, 1963, 28,371/63
7 Claims. (Cl. 264—.5)

The present invention relates to the production of graphite artefacts and it should be understood that the term "graphite" is used loosely to describe materials which are predominantly graphitic in nature although they may contain a proportion of ungraphitized carbon.

Graphite, as will be known, has many uses, particularly in the chemical engineering and nuclear engineering fields, where it is desirable to produce a graphite that has a low effective surface area, i.e. a graphite in which there is only a small proportion of open pores. Additionally of course the low proportion of open pores will result in a high degree of impermeability if these pores do not extend through the article and since in many cases it is allied with a relatively low proportion of closed pores the material will probably have a high density. It is also known that the open pores in a low porosity graphite can be closed to some extent by an impregnation process following production of the graphite artefact.

It is the object of the present invention to provide a new or improved process for the production of graphite artefact.

According to the present invention there is provided a method for the production of graphite artefacts comprising mixing a powder of graphite or graphitisable carbon with dibenzanthrene or dibenzanthrone, pressing to form a shaped green body, heating to a carbonising temperature in the absence of air and thereafter heating to a graphitising temperature.

The process of the present invention may also be used for incorporating particles into a graphite matrix, for example in the production of a fuel for a nuclear reactor.

Thus according to a further aspect of the present invention, a process for the production of a fuel for a nuclear reactor comprises mixing particles of uranium carbide fuel coated with pyrolitic carbon and/or silicon carbide with graphite powder, dibenzanthrone or dibenzanthrene, and optionally a solvent, cold or hot pressing to form a compact body, baking in the absence of air and heat treating the baked body at high temperature.

It should be appreciated that if a hot pressing step is used, the subsequent baking or carbonising step may be unnecessary if the pressing is effected at a sufficiently high temperature.

For the production of a nuclear fuel it will be realised that a graphite powder of high purity, i.e. nuclear grade, should be used, but in the production of graphite artefacts for non nuclear purposes, the use of calcined or uncalcined coke may prove quite satisfactory.

Dibenzanthrene and dibenzanthrone are respectively a hydrocarbon and a quinone derived from the hydrocarbon and are otherwise known under the names violanthrene and violanthrone. Dibenzanthrene may be made from dibenzanthrone by reduction using a mixture of zinc dust, zinc chloride and sodium chloride at 200° C. The yield by this method is 90% and the crude dibenzanthrene was used in the experiments to be described hereinafter. However, if necessary, it may be purified by vacuum sublimation.

We have found that on heating to a carbonising temperature in the region of 800° C., dibenzanthrene gives a 95% carbon yield whilst dibenzanthrone gives an 86% carbon yield, and in both cases the carbon may be converted to graphite by heating to a graphitising temperature in the region of 2700° C. Certain experiments were carried out on a sample of graphite produced from dibenzanthrone in this way and it was found that it had a helium density of 2.23 gm./cc., a mercury density of 1.97 gm./cc. and a carbon tetrachloride density of 2.29 gm./cc. The open pore volume was of the order of 0.05 ccs./gm. and the closed pore volume of the order of 0.01 ccs./gm. Dibenzanthrene gave a graphite having a mercury density of 1.92 gm./cc. and a carbon tetrachloride density of 2.19 gm./cc.

The binders of the present invention produce fewer volatiles during carbonisation than are obtained using pitch binder and thus there is a reduced deposit of carbon throughout the apparatus when the present materials are used as binders. Since it is necessary to remove the carbon deposited on the die and plungers of a hot pressing unit, the need for such carbon removal is reduced and the ratio of production time to cleaning time with a dibenzanthrene or dibenzanthrone as a binder is higher than when a pitch binder is used and thus a higher average rate of production is obtained.

The process of the present invention may be effected by hot pressing at a temperature at which the binder is liquid and this hot pressing may be followed by baking of the green body to carbonise the binder. Alternatively, the hot pressing may be effected at a temperature, for example 800° C., at which carbonisation of the binder occurs, in which case, such hot pressing results in the production of a baked compact. In either case the compact may be heat treated to graphitise the carbon and obtain the required graphite artefact. If desired, a green compact body may be obtained by cold pressing or extrusion, but in such a case a solvent for the binder is required in order that the binder is in the liquid state at the temperature of pressing or extrusion. Using such a process, removal of the solvent under reduced pressure at about 100° C. will be necessary prior to baking and graphitising the compact.

Calcined or uncalcined coke may be used in place of the graphite and indeed any proportions of graphite to calcined coke or uncalcined coke may be used, the proportions being adjusted as is known in the art.

In order that the present invention may more readily be understood, several embodiments of the same are set forth in the following examples.

EXAMPLE 1

Dibenzanthrone was added to a graphite powder having a particle size of less than 300 mesh BSS (about 53 microns), in a proportion of 15% by weight of dibenzanthrone in the mix. The components were dry mixed and then the mixture was placed in a steel die and baked to give a solid right cylindrical body, 1.75 inches diameter by 1.17 inches long. The baking was effected under an unaxial load of 4,000 p.s.i. at a rate of heating of 25° C. per minute up to 750° C., and the baked body was then removed from the die and heat-treated in vacuum up to a temperature of 1800° C.

The bulk density of the body thus obtained was 1.85 gm./cm.$^3$ and the body possessed a thermal conductivity in the radial direction of 0.09 cal. sec.$^{-1}$ cm.$^{-1}$ °C.$^{-1}$ measured at 1200° C. The gaseous permeability coefficients $B_0$ (the viscous flow permeability constant) $K_0$ (the Knudsen flow permeability constant) measured in nitrogen at ambient conditions were $0.7 \times 10^{-12}$ cm.$^2$ and $0.5 \times 10^{-7}$ cm. respectively. The compressive strength of the body was about 8,000 p.s.i.

EXAMPLE 2

The procedure of Example 1 was repeated with the addition of 30% by volume of 600 micron diameter pyrolytic-carbon coated uranium dicarbide particles to the graphite-dibenzanthrone mix to give an annular fuel pellet of 1.75 inches outside diameter, 1.00 inch inside diameter and 1.75 inches in length. After heat treatment, the matrix density of the pellet was 1.81 gm./cm.$^3$.

EXAMPLE 3

75 gms. of graphite powder were mixed with 25 gms. of dibenzanthrone (to give a 1% total volatile content) and subjected to a hot pressing process at a pressure of 3000–4000 p.s.i. and a temperature in excess of about 200° C. so that the dibenzanthrone was molten. The resultant compacts were heated slowly to 800° C. in the absence of air to give dense carbon products which were then treated by heating to 2700° C. in an argon atomsphere to give graphite artefacts of satisfactory density and permeability characteristics.

In addition to relating to a process for making graphite artefacts the present invention should be understood to include graphite artefacts when made by such a process.

I claim:

1. A method for the production of graphite artefacts comprising the steps of mixing a powder of a carbon-containing material selected from the group comprising graphite and graphitisable carbon with a binder, a major portion of said binder being selected from the group consisting of dibenzanthrene and dibenzanthrone, pressing such mix to form a shaped green body, heating the shaped green body to a carbonising temperature in the absence of air to obtain a baked body and subjecting such baked body to a further heat treatment at a temperature in excess of the carbonising temperature.

2. The method of claim 1 wherein dibenzanthrone is mixed with graphite powder in the proportion of 15% by weight of dibenzanthrone.

3. The process of claim 1 wherein the baked body is heated to a temperature of 1800° C.

4. The method of claim 1 wherein the pressing step and heating to a carbonising temperature are effected in one operation by pressing the mix at a temperature of at least 750° C.

5. The method of claim 1 wherein pressing is effected at ambient temperature using a solvent for the binder and the solvent is removed by heating the shaped green body to a temperature of about 100° C. under reduced pressure prior to heating the shaped green body to the carbonising temperature.

6. The method of claim 1 for the production of a fuel body for a nuclear reactor wherein particles of a nuclear fuel are mixed with a graphite powder and the said binder, the mixture is pressed to form a compact body, the compact body is baked in the absence of air and the baked body is heat treated to a temperature in excess of that at which baking is effected.

7. The process of claim 6 wherein the particles of nuclear fuel are added to the graphite powder and binder in a quantity sufficient to gve 30% by volume of fuel particles in the fuel body.

References Cited by the Examiner
UNITED STATES PATENTS
3,158,547  11/1964  Smith _____ 176—91
FOREIGN PATENTS
673,003   5/1952   Great Britain.
OTHER REFERENCES
AEC document, GA–3985, Mar. 7, 1963, pages i, 1–6, 8, 10 and 19.
Peter et al., German application No. 1,049,287, printed Jan. 22, 1959.

L. DEWAYNE RUTLEDGE, *Primary Examiner.*